(12) United States Patent
Shivaprasad et al.

(10) Patent No.: US 11,680,026 B2
(45) Date of Patent: Jun. 20, 2023

(54) FERTILIZER COMPOSITE AND METHOD OF REDUCING DUST FORMATION

(71) Applicant: SHELL OIL COMPANY, Houston, TX (US)

(72) Inventors: Punith Veeralinga Shivaprasad, Houston, TX (US); James Grace Crump, Houston, TX (US)

(73) Assignee: SHELL USA, INC., Houston, TX (US)

( * ) Notice: Subject to any disclaimer, the term of this patent is extended or adjusted under 35 U.S.C. 154(b) by 0 days.

(21) Appl. No.: 17/011,703

(22) Filed: Sep. 3, 2020

(65) Prior Publication Data

US 2020/0399188 A1 Dec. 24, 2020

(51) Int. Cl.
*C05G 5/30* (2020.01)

(52) U.S. Cl.
CPC .................................... *C05G 5/38* (2020.02)

(58) Field of Classification Search
CPC ....................................................... C05G 5/38
See application file for complete search history.

(56) References Cited

U.S. PATENT DOCUMENTS

| 5,300,135 A | 4/1994 | Hudson et al. |
| 5,466,274 A | 11/1995 | Hudson et al. |
| 5,698,002 A | 12/1997 | Hudson |
| 6,355,083 B1 | 3/2002 | Ogzewalla |
| 2015/0376077 A1 | 12/2015 | Barr et al. |
| 2019/0077723 A1 | 3/2019 | Parker et al. |
| 2020/0190356 A1 | 6/2020 | Goodwin, II et al. |
| 2022/0186072 A1 * | 6/2022 | Goodwin, II ............ C05G 5/37 |

FOREIGN PATENT DOCUMENTS

WO    WO 2017/087264 A1 *    5/2017    ............... C05G 3/00

OTHER PUBLICATIONS

Chevron Phillips LP, Safe Handling and Storage of Alpha Olefin Waxes C20-24, C24-28, C26-28, C30+, and C30+HA, 2013, p. 1-19 (Year: 2013).*
International Search Report and Written Opinion received for PCT Patent Application No. PCT/US2021/048850, dated Nov. 29, 2021, 9 pages.

* cited by examiner

*Primary Examiner* — Wayne A Langel
(74) *Attorney, Agent, or Firm* — Shell USA, Inc.

(57) ABSTRACT

A fertilizer composite comprising a simple or complex granular solid fertilizer and a coating covering the fertilizer granules, the coating comprising from 10-90 wt % of a first wax component comprising linear alpha olefin wax having a carbon number in the range of from 20 to 100 and a congealing point in the range of from 40 to 80° C.

6 Claims, 1 Drawing Sheet

| Coating Agent | Before | After |
|---|---|---|
| None (uncoated) | 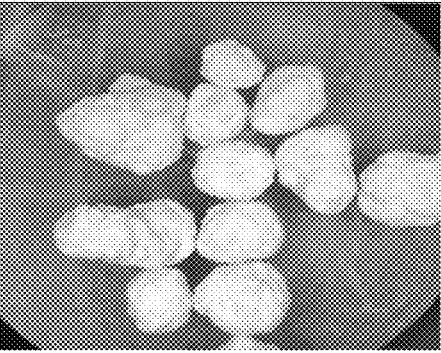 | |
| N26⁺ (0.5%) | 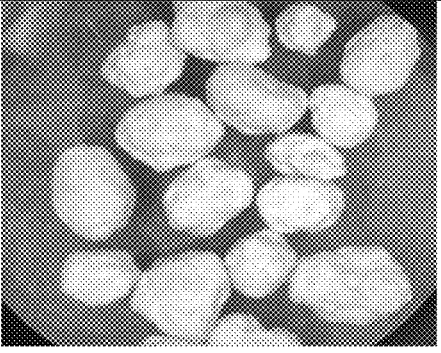 | 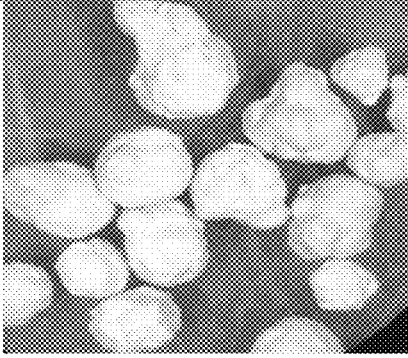 |
| Base Oil (0.4%) | 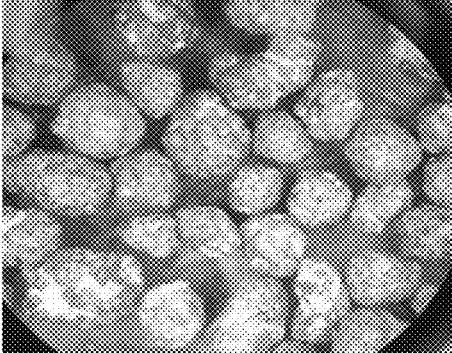 |  |

FERTILIZER COMPOSITE AND METHOD OF REDUCING DUST FORMATION

FIELD OF THE INVENTION

The invention relates to a fertilizer composite and a method of reducing dust formation.

BACKGROUND OF THE INVENTION

Solid granular fertilizer particles are subject to abrasion, leading to fragmentation and subsequent dust generation during manufacture, packaging, transport, and crop treatment. The resulting generation of dust can create safety risks (dust inhalation, risk of fire). For this reason, industrial emissions are regulated by local agencies in order to maintain a certain level of ambient air quality for areas surrounding dust-prone fertilizer manufacturing and storage sites. In addition, processing issues can result from dust generation, for example plugging of conveyor or feeder equipment. Also, severe dust generation can result in measurable loss in the mass of fertilizer to be applied for crop treatment.

The most common approach for suppression of fugitive dust from fertilizer operations is the use of petroleum-derived oils such as paraffinic oils as dust coating agents. This approach may provide a reasonable degree of dust suppression at the point of fertilizer manufacture. However, severe dust generation may occur after base oil application if the fertilizer granules are stored or transported over long periods. Fertilizer supply chains can span a period of 2-12 months and may involve land transport to fertilizer distributors and ultimately to crop treatment sites by railcar or truck. Transport by ocean vessel may further lengthen the supply chain time span in the case of export fertilizer sales.

In addition, when granular fertilizers are packaged in bags, high base oil application rates (greater than 0.5-1.0%) can lead to oil seepage into the packaging material, weakening the packaging material and causing packaging failure and fertilizer spillage. Also, petroleum-derived oils should not be used for coating ammonium nitrate granules because of increased detonation sensitivity.

It would be desirable to produce a granular fertilizer coating that is capable of reducing dust generation.

SUMMARY OF THE INVENTION

The present invention provides a fertilizer composite comprising a simple or complex granular solid fertilizer and a coating covering the fertilizer granules, the coating comprising from 10-90 wt % of a first wax component comprising an alpha olefin wax having a carbon number in the range of from 20 to 100 and a congealing point in the range of from 40 to 80° C.

The present invention also provides a method of reducing dust formation, the method comprising coating a fertilizer particulate with a coating, the coating comprising from 10-90 wt % of a linear alpha olefin wax having a carbon number in the range of from 20 to 100 and a congealing point in the range of from 40 to 80° C.

BRIEF DESCRIPTION OF THE DRAWINGS

FIGURE is a photograph depicting some of the fertilizer granules tested and described in the Examples.

DETAILED DESCRIPTION OF THE INVENTION

The present invention provides a fertilizer wax coating utilizing alpha olefin waxes that affords greater protection against fertilizer particle breakage and consequent dust generation than base oil, the traditional material of choice for coating of fertilizer particles for fugitive dust mitigation purposes. The benefits of such an alpha olefin wax coating is most apparent in the later stages of the fertilizer supply chain.

Wax products find important uses as coatings in the manufacture of solid granular fertilizers. Such uses of wax include fugitive dust mitigation, anti-caking to permit granular free flow, and controlled release of fertilizer nutrients. Wax may be applied to granules of several types of fertilizer including monoammonium phosphate—MAP, diammonium phosphate—DAP, superphosphate (a mixture of calcium acid phosphate and calcium sulfate), triple superphosphate (calcium acid phosphate), ammonium sulfate, potassium phosphate, potassium sulfate, potassium nitrate, urea, and ammonium nitrate. These different fertilizer types are often blended in order to deliver a diverse set of soil nutrients by crop treatment using a single fertilizer product.

Loss of effectiveness for fugitive dust suppression by use of base oil coatings has been attributed to the absorption of base oil into the fertilizer granules with loss of the particle surface coating and subsequent loss of protection against particle fragmentation and dust generation. By contrast a wax, once applied to the surface of a fertilizer particle, tends to remain at the particle surface. This difference, absorption of base oils into the particle interior and continued coating of the surface by waxes, may be due largely to the difference in molecular chain length and molecular weight, with the lower molecular weight species (base oil) more likely to be absorbed into the pore structure of a fertilizer particle.

Embodiments of the invention include a fertilizer composite having a simple or complex granular solid fertilizer and a coating covering the fertilizer granules. The coating may include from 10-90 wt % of a first wax component being an alpha olefin wax having a carbon number in the range of from 20 to 100 and a congealing point in the range of from 40 to 80° C. The fertilizer composite of may also include from 10-90 wt % of a second wax component having a carbon number of from 15 to 30 and a congealing point in the range of from 20 to 50° C. The second wax component is a linear alpha olefin wax. The fertilizer may also include a third component being one or more paraffinic waxes, one or more Fischer Tropsch waxes, one or more microwaxes, one or more waxes derived from palm, soy, or tallow sources and/or one or more base oils. The fertilizer composite may include from 1-15 wt % of the third component. The first wax component may be an alpha olefin wax having a carbon number in the range of from 20 to 100. The second wax component may be an alpha olefin wax having a carbon number in the range of from 15 to 30.

Another embodiment includes a method of reducing dust formation, the method includes coating a fertilizer particulate with a coating. The coating includes from 10-90 wt % of a linear alpha olefin wax having a carbon number in the range of from 20 to 100 and a congealing point in the range of from 40 to 80° C. The coating may also include from 10-90 wt % of a second wax component having a carbon number of from 15 to 30 and a congealing point in the range of from 20 to 50° C. The coating may further include a third component comprising one or more paraffinic waxes, one or more Fischer Tropsch waxes, one or more microwaxes, one or more waxes derived from palm, soy, or tallow sources and/or one or more base oils. The coating may include from 1-15 wt % of the third component. The first wax component may be an alpha olefin wax having a carbon number in the range of from 20 to 100. The second wax component may be an alpha olefin wax having a carbon number in the range of from 15 to 30.

EXAMPLES

The granular solid fertilizer selected for dust generation testing was a commercially available monoammonium phosphate (MAP) fertilizer that also contained ammonium sulfate. Separate 3,000-gram samples were prepared and tested, with each test being conducted in triplicate (at each dust generation testing point, three separate measurements were made based on sample weight).

The 3,000-gram samples included:
Uncoated Sample Control (No Coating of Either Wax or Base Oil)
Three samples coated with Shell® NEODENE™ 26+ alpha olefin wax (application rates: 0.5, 1.0, 1.5 weight %).
Three samples coated with a 50%/50% blend of Shell® NEODENE™ 2024 alpha olefin wax and NEODENE™ 26+ alpha olefin wax (wax application rates: 0.5, 1.0, 1.5 weight %).
Three samples coated with NEODENE™ 2024 alpha olefin wax (wax application rates: 0.5, 1.0, 1.5).
Two samples whose coatings were base oil blends (application rates, approximately 0.25 and 0.4 weight %).

Shell® NEODENE™ 2024 is a linear alpha olefin that contains high purity C20, C22 and C24 alpha olefins. It may also contain a small amount of C18 and lower and/or C24 and higher alpha olefins. Shell® NEODENE™ 26+ is a linear alpha olefin having a broad range of alpha olefins mostly having carbon numbers of 26 or greater.

In all cases, application rate equals the weight of applied coating (wax or base oil) divided by the weight of granular fertilizer.

Sample preparation: Each 3,000-gram sample was coated by spraying a quantity of the coating agent (molten wax or base oil) based on the target application rate over a rolling bed of granules in a rotating drum. An additional 10 weight % of coating agent (molten wax or base oil) was added to account for wax or base oil remaining in the drum or in the beaker used for weighing of the coating agent.

Sample conditioning to simulate fertilizer storage: The effect of temperature variation during fertilizer storage and transport was simulated by placing each sample in a convection oven at 140° F. during daylight hours, then ambient temperature (oven off) during nighttime hours.

Dust testing: At intervals of 0, 2, 4, 6 and 8 weeks after coating by wax or base oil, temperature-conditioned samples of approximately 100 grams were subjected to 1000 RPM mixing for three minutes in a FlakTek Speed Mixer, then each sample was weighed, and then placed in a 100N Fluid Bed operating at 250-300 stfpm air velocity (standard feet per minute) to remove particles of 150-micron size or smaller. Then each sample was again weighed. Dust generation was determined based on the difference in weight before and after Fluid Bed treatment.

Example 1: NEODENE™ 26+ for Fertilizer Coating

The results of the measurement of dust generation for samples coated by NEODENE™ 26+ (N26+) indicated the benefits provided by this alpha olefin wax compared to base oil at extended periods of temperature conditioning for simulation of storage and transport. Dust generation in parts per million of fertilizer initial weight for each of five points of measurement (0, 2, 4, 6, and 8 weeks), indicating the effectiveness of NEODENE™ 26+ as a dust suppressant in comparison with uncoated granules and in comparison with granules coated by base oil is shown in Table 1.

TABLE 1

| Coating Agent | Week 0 | Week 2 | Week 4 | Week 6 | Week 8 |
|---|---|---|---|---|---|
| None (uncoated) | 1926 | 2472 | 3008 | 3605 | 4102 |
| N26+ (0.5%) | 512 | 1739 | 2019 | 2093 | 2180 |
| N26+ (1.0%) | 494 | 1892 | 1943 | 1882 | 2005 |
| N26+ (1.5%) | 399 | 1533 | 1791 | 1799 | 1859 |
| Base Oil (0.4%) | 249 | 1443 | 2000 | 2132 | 2717 |

Compared to the dust levels measured for the base oil coating, the dust levels measured for the N26+ coatings for all application rates were approximately equal or lower at week 4. During the interval from week 4 to week 8, the dust level rose by about 36% for the sample coated by base oil, by only 8% for N26+ at 0.5% and by 3-4% for N26+ at 1.0 and 1.5%. Week 8 dust levels for N26+ at application rates of 0.5, 1.0 and 1.5% were lower than for base oil by 20%, 26%, and 32% respectively. These results indicate that NEODENE™ 26+ wax can be used effectively for dust suppression for fertilizer storage and transport.

Example 2: A Blend of NEODENE™ 26+ and NEODENE™ 2024 for Fertilizer Coating

The results of the measurement of dust generation for samples coated by a blend of NEODENE™ 26+ and NEODENE™ 2024 alpha olefin waxes (50%/50% by weight) indicated that the performance of a blend of alpha olefin waxes for dust suppression varies with the average carbon number and the congealing point of the wax blend. Dust generation after extended simulation of storage and transport (8 weeks) were lower for the wax blend at all application rates (0.5, 1.0 and 1.5%) than for the samples coated by base oil, however dust generation for shorter periods (0, 2, 4, and 6 weeks) were higher for the granules coated by the wax blend. Dust generation in parts per million of fertilizer initial weight for each of five points of measurement (0, 2, 4, 6, and 8 weeks) is shown in Table 2.

TABLE 2

| Coating Agent | Week 0 | Week 2 | Week 4 | Week 6 | Week 8 |
|---|---|---|---|---|---|
| None (uncoated) | 1926 | 2472 | 3008 | 3605 | 4102 |
| N26+/N2024 (0.5%) | 1145 | 1892 | 2128 | 2173 | 2264 |
| N26+/N2024 (1.0%) | 1084 | 1983 | 2203 | 2262 | 2284 |
| N26+/N2024 (1.5%) | 1057 | 1907 | 2300 | 2370 | 2484 |
| Base Oil (0.4%) | 249 | 1443 | 2000 | 2132 | 2717 |

Compared to dust levels measured for the base oil coating, the dust levels measured for the blend of NEODENE™ 26+ and NEODENE™ 2024 alpha olefin waxes for application rates of 0.5, 1.0, and 1.5% were lower than for base oil by approximately 17%, 16%, and 8% respectively after 8 weeks of storage and transport simulation. These results indicate that the blend of NEODENE™ 26+ and NEODENE™ 2024 alpha olefin waxes, while less effective than NEODENE™ 26+ applied neat, affords greater protection at extended simulated storage and transport (8 weeks) than the base oil coating.

The visual examination of fertilizer granules provides insight into the performance benefit of NEODENE™ 26+, as a dust control agent compared to base oil. Visual examination by microscope of uncoated granules, of granules coated by NEODENE™ 26+, and of granules coated by base oil before and after dust testing indicate a uniform, unbroken coating for granules that were coated by NEODENE™ 26+ but uneven coating coverage with gaps or "windows" for granules coated by base oil.

Uniform coverage (an absence of gaps or "windows") apparently provides mechanical strength to coated granules and provides a more effective moisture barrier. These factors, integrity of the granular coating and moisture barrier effectiveness, may be important in the prevention of fragmentation or breakage of granules and consequent generation of dust.

What is claimed:

1. A fertilizer composite comprising a simple or complex granular solid fertilizer and a coating covering the fertilizer granules, the coating consisting essentially of a first wax component comprising a linear alpha olefin having carbon numbers of 26 or greater and a congealing point of from 40 to 80° C.

2. The fertilizer composite of claim 1 wherein the granular solid fertilizer is selected from monoammonium phosphate—MAP, diammonium phosphate—DAP, superphosphate (a mixture of calcium acid phosphate and calcium sulfate), triple superphosphate (calcium acid phosphate), ammonium sulfate, potassium phosphate, potassium sulfate, potassium nitrate, urea, or ammonium nitrate.

3. A fertilizer composite comprising a simple or complex granular solid fertilizer and a coating covering the fertilizer granules, the coating consisting essentially a first wax component comprising a linear alpha olefin having carbon numbers of 26 or greater and a congealing point of from 40 to 80° C.
and a second wax component comprising a linear alpha olefin wax including C20, C22 and C24 alpha olefins and a congealing point of from 20 to 50° C.

4. The fertilizer composite of claim 3 wherein the granular solid fertilizer is selected from monoammonium phosphate—MAP, diammonium phosphate—DAP, superphosphate (a mixture of calcium acid phosphate and calcium sulfate), triple superphosphate (calcium acid phosphate), ammonium sulfate, potassium phosphate, potassium sulfate, potassium nitrate, urea, or ammonium nitrate.

5. A method of reducing dust formation, the method comprising coating a fertilizer particulate with a coating, the coating consisting essentially of a linear alpha olefin wax having carbon numbers of 26 or greater and a congealing point of from 40 to 80° C.

6. A fertilizer composite comprising a simple or complex granular solid fertilizer and a coating covering the fertilizer granules, the coating consisting essentially of a first wax component comprising a linear alpha olefin having carbon numbers of 26 or greater and a congealing point of from 40 to 80° C.; a second wax component comprising a linear alpha olefin wax including C20, C22 and C24 alpha olefins and a congealing point of from 20 to 50° C.; and a third component comprising one or more paraffinic waxes, one or more Fischer Tropsch waxes, one or more microwaxes, one or more waxes derived from palm, soy, or tallow sources and/or one or more base oils.

* * * * *